(12) United States Patent
Andreasson

(10) Patent No.: US 7,035,429 B2
(45) Date of Patent: Apr. 25, 2006

(54) METHOD AND DEVICE FOR ADDRESSING MAIL ITEMS

(75) Inventor: Markus Andreasson, Lund (SE)

(73) Assignee: Anoto IP LIC Handelsbolag, Lund (SE)

( * ) Notice: Subject to any disclaimer, the term of this patent is extended or adjusted under 35 U.S.C. 154(b) by 668 days.

(21) Appl. No.: 09/986,678

(22) Filed: Nov. 9, 2001

(65) Prior Publication Data

US 2002/0057824 A1    May 16, 2002

Related U.S. Application Data

(60) Provisional application No. 60/261,921, filed on Jan. 16, 2001.

(30) Foreign Application Priority Data

Nov. 10, 2000  (SE) .................................. 0004121

(51) Int. Cl.
*G06K 9/00* (2006.01)
(52) U.S. Cl. ...................... 382/101; 382/179; 382/187; 382/313; 209/584
(58) Field of Classification Search ................ 382/101, 382/314, 187, 188, 122, 120, 179, 313; 270/1.02; 345/179; 209/584, 900; 705/401, 408; 700/220; 707/1
See application file for complete search history.

(56) References Cited

U.S. PATENT DOCUMENTS

| 5,031,223 | A | * | 7/1991 | Rosenbaum et al. ........ 382/101 |
| 5,852,434 | A | * | 12/1998 | Sekendur .................... 345/179 |
| 6,081,261 | A |   | 6/2000 | Wolff et al. |
| 6,555,776 | B1 | * | 4/2003 | Roth et al. ................... 209/584 |
| 6,593,908 | B1 | * | 7/2003 | Borgstrom et al. ......... 345/156 |
| 2001/0032033 | A1 | * | 10/2001 | Krasuski et al. ............ 700/220 |
| 2002/0000981 | A1 | * | 1/2002 | Hugosson et al. ......... 345/179 |
| 2002/0026425 | A1 | * | 2/2002 | Fahraeus ..................... 705/64 |
| 2003/0046256 | A1 | * | 3/2003 | Hugosson et al. ............ 707/1 |
| 2003/0061188 | A1 | * | 3/2003 | Wiebe et al. .................. 707/1 |

FOREIGN PATENT DOCUMENTS

| EP | 0907278 A2 | 4/1999 |
| WO | WO 99/46909 | 9/1999 |
| WO | 99/50787 | 10/1999 |
| WO | WO 00/00928 | 1/2000 |
| WO | WO 00/11596 | 3/2000 |

* cited by examiner

*Primary Examiner*—Barry Choobin
(74) *Attorney, Agent, or Firm*—Birch, Stewart, Kolasch & Birch, LLP

(57) ABSTRACT

Systems and methods provide for remote addressing of an item of mail that include obtaining remotely produced address information. The address information includes a digitally represented graph of a handwritten address and sending the graph to a device adapted to apply the graph to the item of mail.

13 Claims, 2 Drawing Sheets

METHOD AND DEVICE FOR ADDRESSING MAIL ITEMS

This application claims the benefit of 60/261,921 filed Jan. 16, 2001

TECHNICAL FIELD

The present invention relates to methods and devices for automatic application of an address on an item of mail.

BACKGROUND ART

In spite of the fact that modern electronic communication technology makes possible practically instantaneous contact between people, traditional printed publications, such as newspapers, trade publications and magazines, continue to be an important medium for the transmission of information. In addition to being a provider of information from a publisher to readers, many publications can also contain channels for transmission of information in the opposite direction, from the reader to the publisher or advertiser, such as order forms or order coupons.

Order forms are often used by advertisers to make possible simple ordering of a product or further information, by the reader writing an order on the form, for example ticking an order option, writing his name and address and sending the form in a stamped envelope through the normal postal channels to, for example, the advertiser or some other specified recipient.

Mail order catalogues and the order forms included in these are another example of an area of application where the present invention can advantageously be used.

In spite of the obvious disadvantages of this method of communication, for example the fact that the reader/person placing the order must post a physical item of mail in a post box intended for the purpose, there has been no significant simplification of the mail handling procedure for a long time.

SUMMARY OF THE INVENTION

An abject of the present invention is therefore to remedy said problems from a number of different aspects. This is achieved by the methods, computer programs, devices, storage mediums, and computers, as disclosed herein.

Thus a first aspect of the invention is a method for addressing an item of mail. The method comprises obtaining address information, preferably utilizing one or more suitably programmed computers, where the address information comprises a digitally represented graph of a handwritten address, written by a user. In addition, the method comprises automatically providing the address information to a device adapted to apply the address information on the item of mail.

A suitable way of obtaining the address information is via a wireless interface from a mobile communication unit, connected to a digitizing pen via, for example, a further wireless interface such as the standardized interface Bluetooth. A digitizing pen suitable for this purpose can generate a data sequence which, by means of suitable coding, represents the pen's instantaneous position in a coordinate system.

Such a pen is disclosed in the publication WO 01/26032, which comprises a device for position determination is shown. The pen reads a position-coding pattern which has a number of intrinsic advantages. Other examples of digitizing devices comprise those which calculate the movement of a digitizing pen when handwriting is carried out, by means of acceleration sensors or by means of radio-based or ultrasound-based triangulation devices or by means of devices similar to trackballs. The present invention assumes only that a data sequence of position coordinates is obtained, where the data sequence represents a graph of the movement of the pen when writing an address.

The information obtained is then preferably printed out on an item of mail such as a letter, postcard or address label intended for a parcel. This printout has thereby essentially the same appearance as the originally handwritten address. If required, certain processing can be carried out on the address information obtained, i.e. the sequence of movement coordinates for the pen, for example with the aim of making the handwriting clearer or evening out digitizing effects.

Other aspects of the invention are devices such as a computer that comprises means for carrying out program instructions in accordance with the method according to the invention, and also storage mediums that contain software comprising program instructions intended to be executed for the implementation of the method according to the invention.

Other objects, features and advantages of the invention will become apparent from the following detailed description of embodiments of the invention with reference to the drawings.

DETAILED DESCRIPTION OF EMBODIMENTS OF THE INVENTION

Figure 1:
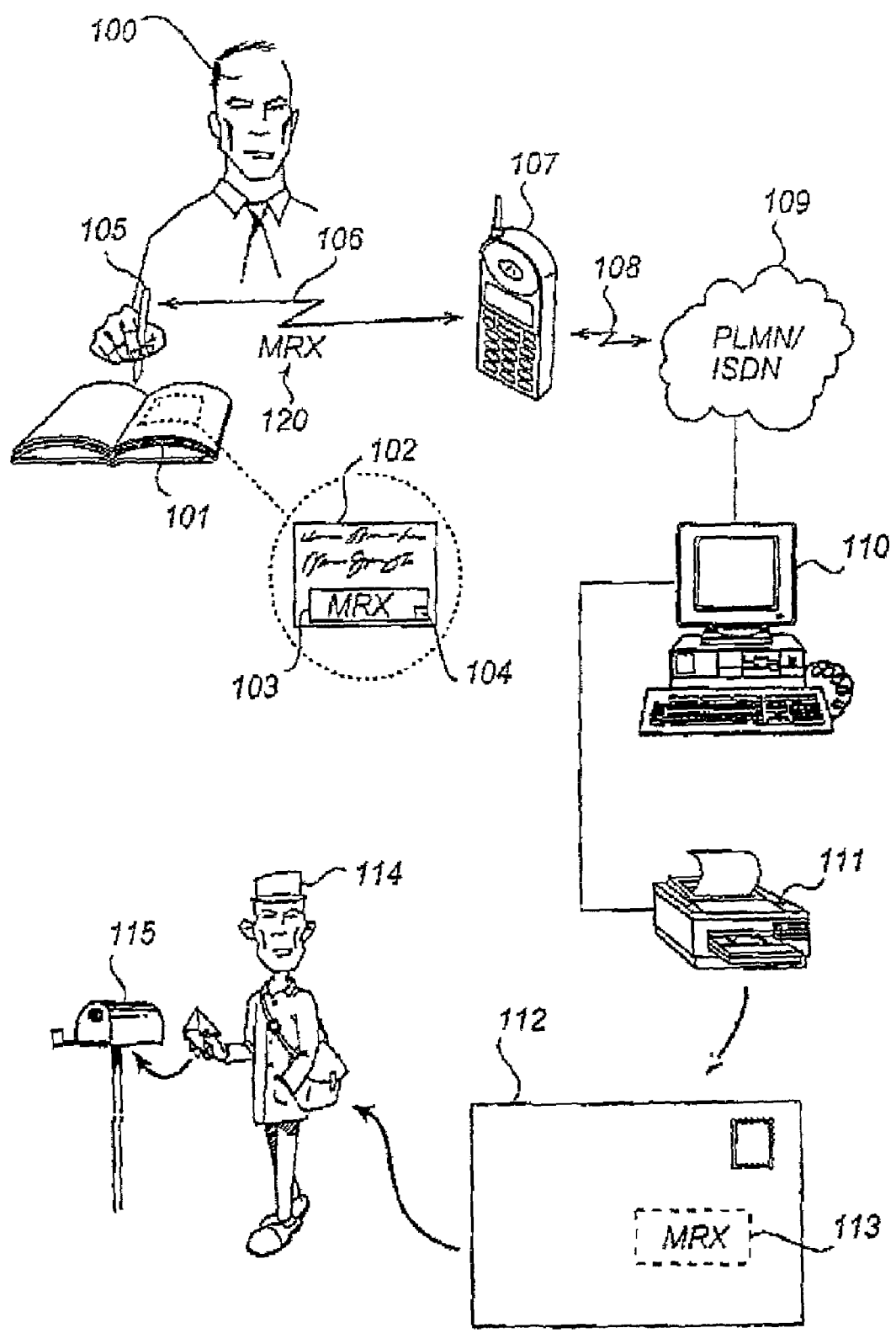
FIG. 1 is a schematic view showing a system in which a method according to an embodiment of the invention is implemented.
Figure 2:
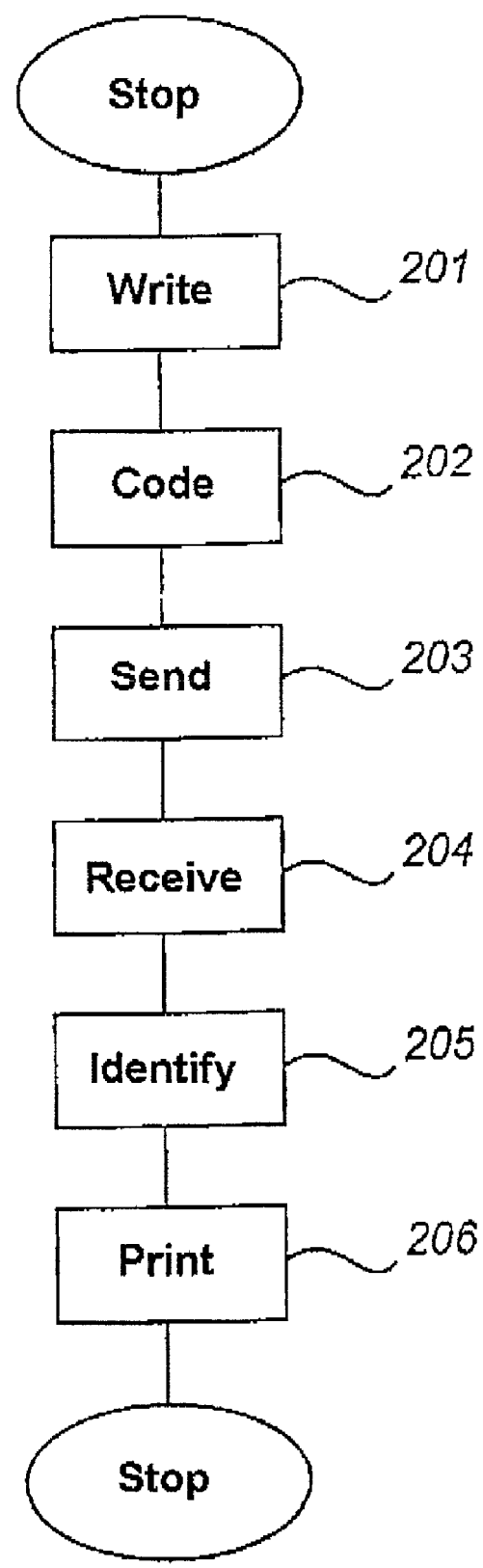
FIG. 2 is a schematic view and shows a flow diagram for the implementation of a method according to the invention.

Below, a detailed description of a method and a device for addressing an item of mail according to the invention will be given.

The starting point is a user who reads an advertisement in a magazine that gives the opportunity to order, for example, a brochure or other information about the company or advertiser. The advertisement is printed on a surface in the magazine that is at least partly provided with a position-coding pattern according to the above-mentioned publication WO 01/26032. The user puts a tick or a cross in a box to order the brochure and writes the address to which the brochure is to be sent. The writing is carried out using a digitizing pen with a pen point, exemplified, as already mentioned, by the device in the publication WO 01/26032. A digitized and coded information quantity, representing the graph followed by the pen when writing, is sent from the pen via a radio interface, for example Bluetooth, via the user's mobile phone to the company that had the advertisement printed in the magazine and that is allocated the part of the position-coding pattern to be found in the advertisement.

The digitizing pen thus sends the address information via the mobile phone and the Internet to the company's computer or server. Other modem-connected devices can also be used. Software in the pen sends the coded information quantity to the company using standardized data transmission procedures, in real time or at a later time, via a mobile telephone network operator's server or similar server installation connected to the Internet. The company thereby obtains for its information management system the address information entered by the user.

The handwritten address is then printed out by the company's information management system on, for example, an item of mail or on an address label that is attached to the item of mail, and the item of mail is then sent to a postal service of traditional type. A postman at the postal service then reads the address on the item of mail in the normal way and delivers it to the recipient, i.e. the user who placed the order.

A major technical advantage of the invention as discussed above in these different aspects is that the handling of items of mail is simplified, more rapid and more reliable. In particular, the invention involves the simplification that the handwritten text, i.e. the address that is to be attached to the item of mail, does not need to be analyzed at any stage by, for example, processing-intensive optical character recognition (OCR). Even though OCR technology is well-known and frequently used, it is principally intended for the recognition of printed text. The recognition of handwritten text (ICR, intelligent character recognition) is, on the other hand, still very difficult and often generates unreliable results and requires the computers that are carrying out the processing to have a relatively large amount of processing power. Thus, in the present invention, it is a postman who interprets the address information that was written by the user. The requirement for the address information to be legible is the responsibility of the user/person placing the order, instead of the company. The fact that the postman interprets the information is, however, an advantage, as even carelessly written addresses can usually be deciphered.

A further advantage is that the handling of the address information within the company can be carried out completely automatically and is transparent to the company. That is, manual interference can be avoided and hence the addressing procedure can be seen, from the point-of-view of the user, as a conveniently available remote-control address label printer.

The advantageous simplification afforded by the invention has in turn the more commercially-oriented advantage that it is easier for an advertiser or publisher of a publication to tempt or persuade a reader/person placing an order to order a product or information, for example.

FIG. 1 shows schematically the communicating units in the embodiment and, to a certain extent, brief explanations of the signals that are sent between the units.

A user 100 reads a publication 101 in which an advertisement 102 is printed on one of the pages in the publication 101. The surface on which the advertisement 102 is printed has been provided with a position-coding pattern (not shown in the figure) as described in WO 01/26032. At least the part of the advertisement 102 that contains an order coupon 103 has been provided with the pattern. The position-coding pattern is unique over a very large area, which enables one or more parts of the area to be reserved by and thereby to be allocated to the company or the advertiser that had the advertisement printed.

The user 100 finds that he is interested in obtaining more information from the advertiser who had the advertisement 102 printed, and so he fills in his name and address on the order coupon 103 in a writing step 201, using a digitizing pen 105 provided with a pen point. If he knows that a friend needs the information, he writes the friend's address.

After having written the name and address, the user 100 makes a mark with the pen 105 in a send box 104 on the order coupon 103. The digitizing pen 105 has functions for reading off the position-coding pattern along the graph 120 that the point of the pen 105 makes when the user writes his name and address on the order coupon 103. The read-off and digitized graph 120 comprises a data sequence of position coordinates and is sent in coded form, after having been coded in a suitable way in a coding step 202, via a radio interface 106 and onwards via a mobile terminal 107 owned by the user 100, to a server, via the Internet. The mobile terminal thus acts only as a modem for the pen. The user 110 making a mark in the send box 104 initiates the transmission that is carried out in a sending step 203. The server contains information about which company is allocated the pattern in the send box and ensures that the digitized graph 120 is forwarded via a radio interface such as GSM/GPRS, via a mobile communication network 109, to a computer 110, where the graph 120 is received in a receiving step 204.

The received, digitized and coded graph 120 is decoded in the computer 110 in an identifying step 205 where the allocation to the advertiser has been carried out in the above-mentioned server.

If required, the graph 120 can be analyzed and improved with regard to legibility and edge definition, after which the graph 120 is printed out in a printing step 206 using a printer 111 connected to the computer 110. The printout 113 can be in the form of an address label intended to be attached to an item of mail or in the form of a direct printout 113 on an item of mail 112. To make the process fully transparent at the server side, in case the address was written on an address label, the label is automatically attached to an item of mail. Thus, no manual intervention is needed at the server side. The only manual step is the writing of the address at the advertisement by the user.

The printout 113, showing the address written by the user 110, is interpreted in the traditional way by a postman 114 who delivers the item of mail 112 to a mailbox 115 that is located, for example, at the premises of the user 110.

The method can comprise carrying out all the described steps in real time and an address label can be printed out more or less immediately when the user writes with the pen, so-called remote printout on-line. However, the method preferably comprises delaying the transmission of the address information during one or more of the steps. For example, it can be assumed that a user will use the invention in places where communication with a server via the Internet is impossible, such as when the user's mobile phone is incapable of communicating or is not available. In such cases, the delay can involve a buffering of the information in the pen. In other cases, the information can be buffered on the Internet and, in yet other cases, the server/computer can delay the printing-out of the address information.

The method as described above is suitably implemented by a person skilled in the art using the programming tools that are available in the known technology and using the information that is to be found in publication WO 01/26032, the technical contents of which is incorporated in the present specification by reference.

The various steps of the method that are described above can be combined in a different sequence and in a different way to that described. Such combinations that are obvious to a person skilled in the art who reads this description are intended to be included within the scope of the invention. The invention is limited only by the appended claims.

I claim:

1. A method for remote addressing of an item of mail, comprising obtaining remotely produced address information, the address information comprising a digitally represented graph of a handwritten address, and sending said graph to a device adapted to apply the graph to the item of mail, wherein obtaining the address information comprises obtaining a sequence of coordinates representing the graph of the handwritten address.

2. A method as claimed in claim 1, wherein the address information is obtained via at least one wireless interface from a mobile communication unit.

3. A method as claimed in claim 1, wherein the address information is obtained from a digitizing pen.

4. A method as claimed in claim 1, wherein the digitally represented graph of a handwritten address is obtained by decoding a position-coding pattern arranged on a product.

5. A method as claimed in claim 1, wherein the applying of the address information to the item of mail comprises causing a printer to print out the address information on at least one of an address label, and envelope.

6. A computer program stored on a program medium comprising program instructions for implementing a method as claimed in claim 1.

7. A device for remote addressing of an item of mail, comprising means for obtaining remotely produced address information, the address information comprising a digitally represented graph of a handwritten address, and means for sending said graph to a device adapted to apply the graph to the item of mail, wherein the means for obtaining address information comprises means for obtaining a sequence of coordinates representing a graph of the handwritten address.

8. A device as claimed in claim 7, wherein the means for obtaining the address information comprises means for obtaining the address information via at least one wireless interface from a mobile communication unit.

9. A device as claimed in claim 7, wherein the means for obtaining the address information comprises means for obtaining the address information from a digitizing pen.

10. A device as claimed in claim 7, wherein the digitally represented graph of a handwritten address is obtained using means for decoding a position-coding pattern arranged on a product.

11. A device as claimed in claim 7, wherein the means for applying the address information to the item of mail comprises means for causing a printer to print out the address information on at least one of an address label and envelope.

12. A storage medium storing program instructions, executed by a processor for performing the method as set forth in claim 1.

13. A computer programmed to perform the method as recited in claim 1.

* * * * *